United States Patent [19]

McCafferty

[11] Patent Number: 4,736,771
[45] Date of Patent: Apr. 12, 1988

[54] VALVE ASSEMBLY FOR PIPELINE

[75] Inventor: John J. McCafferty, Coalpit Heath, England

[73] Assignee: Forsac Valves Limited, Edinburgh, Scotland

[21] Appl. No.: 871,477

[22] Filed: Jun. 6, 1986

[30] Foreign Application Priority Data

Jun. 7, 1985 [GB] United Kingdom ............. 8514420

[51] Int. Cl.⁴ ............................................. F16K 15/18
[52] U.S. Cl. ................................ 137/614.17; 251/309
[58] Field of Search ..................... 137/614.16, 614.17, 137/614.18, 527; 251/309

[56] References Cited

U.S. PATENT DOCUMENTS

| 1,689,296 | 10/1928 | Redding ................. 137/614.16 |
| 2,151,098 | 3/1939 | Greenwood . |
| 3,348,569 | 10/1967 | Forye . |
| 3,363,650 | 1/1968 | Scaramucci ............. 137/614.17 |
| 3,474,818 | 10/1969 | Hartman ............. 137/614.17 X |
| 3,763,890 | 10/1973 | Wolf ..................... 137/614.17 |
| 4,230,154 | 10/1980 | Kolbfleish . |

FOREIGN PATENT DOCUMENTS

| 24398 | 10/1883 | Fed. Rep. of Germany . |
| 1388055 | 12/1964 | France . |
| 7514118 | 12/1977 | Netherlands . |
| 1473546 | 5/1977 | Sweden . |
| 748888 | 5/1956 | United Kingdom . |
| 1216989 | 12/1970 | United Kingdom . |
| 1395267 | 5/1975 | United Kingdom . |
| 1418245 | 12/1975 | United Kingdom . |
| 1553106 | 10/1979 | United Kingdom . |
| 2143929 | 2/1985 | United Kingdom . |
| 2157809 | 10/1985 | United Kingdom . |

Primary Examiner—A. Michael Chambers
Assistant Examiner—John C. Fox
Attorney, Agent, or Firm—Larson and Taylor

[57] ABSTRACT

A valve assembly for a pipeline has a rotatable sleeve within a chamber which houses obturator means such as a check valve assembly. The chamber and sleeve have through passages which can be brought into and out of register by rotating the sleeve. Thus the chamber can be isolated from the pipeline, and the obturator can be serviced and/or removed and replaced.

8 Claims, 1 Drawing Sheet

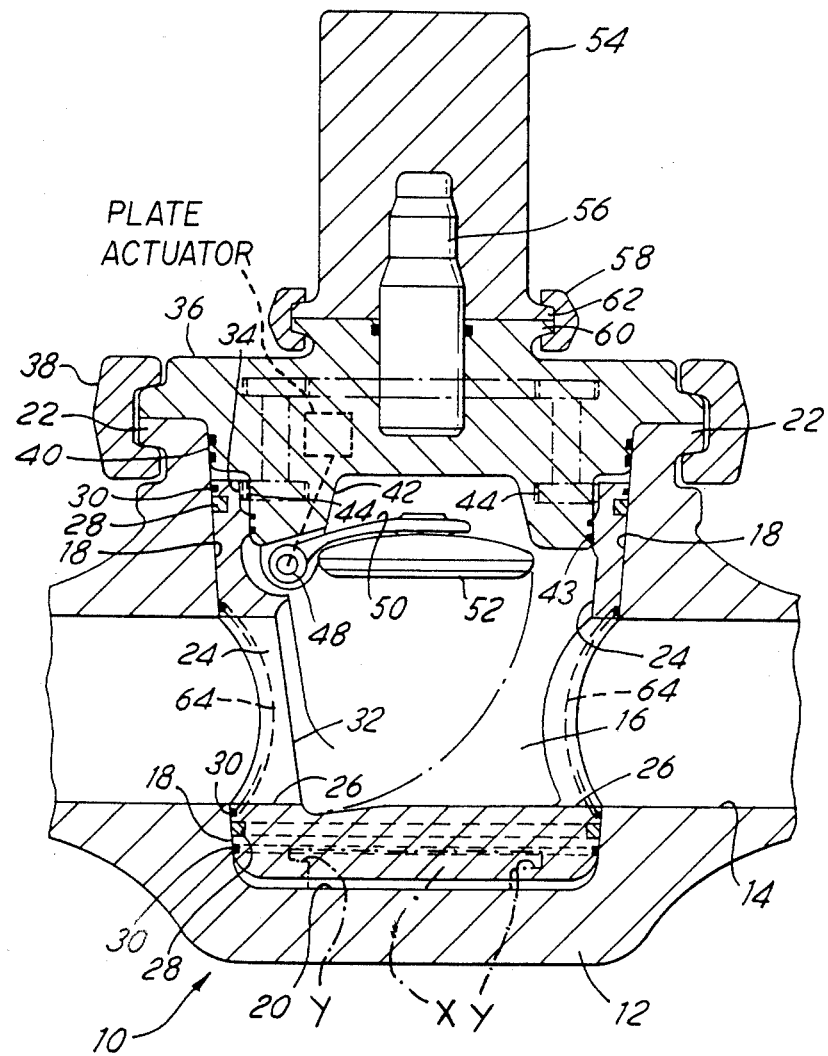

VALVE ASSEMBLY FOR PIPELINE

BACKGROUND OF THE INVENTION

The present invention concerns a valve assembly for a pipeline, particularly (though not exclusively) for an undersea pipeline, e.g. for oil or gas.

A known type of valve has a body which has a through passage for connection in line in a pipeline, the body containing obturator means for controlling flow through the passage; and the body being openable for maintenance, which may involve removal of the obturator means. Thus our published British patent specification No. 2143929 (U.S. Ser. No. 632,843) discloses a ball valve in which the body provides a socket that receives a replaceable core unit containing the ball member and seals and bearings therefor. Less sophisticated valves may still allow access and removal of parts. Check valves are often inconvenient because the obturator elements (i.e. the check plates) are pivoted on axle pins that pass right through the body, so that removal of an element is difficult or impossible, particularly for a check valve installed in an undersea pipeline.

It is a general problem with underwater valves that when they are opened in situ, water floods into the pipeline. It may take weeks to flush it all out again after the valve has been reassembled.

SUMMARY OF THE INVENTION

Thus in one aspect the present invention is concerned with a valve assembly that has means for preventing communication of the external environment with the pipeline when the valve is opened for external access and/or the obturator means are removed.

In another aspect the invention concerns a check valve in which the obturator means are readily removable.

Thus in one preferred form, a valve assembly comprises a valve body that provides a socket which receives a rotatable sleeve which in turn provides a socket which receives the obturator means. The sleeve has a through passage which, in use, is aligned with a through passage in the body which communicates with the pipeline. The sleeve is rotatable so that its passage no longer communicates with that of the body, which is thereby sealed. The obturator means can then be removed, and water getting into the interior of the sleeve is unable to penetrate into the flow passage in the body and hence into the pipeline.

The obturator means within the sleeve can be those of any valve type. For example, they could comprise a core unit as disclosed in GB No. 2143929 referred to above. They may be a check valve sub-assembly, preferably comprising a check plate pivoted to a cap member, with which it is removable.

A preferred check valve embodying the invention comprises a valve body which has a through passage and an upper opening; and a sub-assembly which is removably attachable so as to close said upper opening, and to provide a check plate for controlling flow through the passage. Preferably the body includes a rotatable sleeve, and it may be a through passage in this with which the check plate cooperates.

BRIEF DESCRIPTION OF THE DRAWING

A preferred embodiment of the invention will be now be described in greater detail with reference to the accompanying drawing, which is a schematic vertical section through a check valve embodying the invention.

DESCRIPTION OF THE PREFERRED EMBODIMENT

The check valve 10 comprises a body 12 which has means (not shown) for connection into a pipeline. It has a through passage 14 which, in use, constitutes part of the pipeline. It provides an upwardly open chamber 16 whose wall 18 has a slight conical taper, decreasing towards the base 20. Around the mouth of the chamber 16 is an outwardly projection annular flange 22.

A cup-shaped sleeve 24 is rotatably mounted in the chamber 16. It is open upwardly, and terminates some way beneath the flange 22. It has a bore 26 which can be oriented in line with the passageway 14 of the body, which is of substantially the same diameter. Above and below the bore 26, the sleeve 24 has bearings 28. Each of these is suitably an annulus (extending in a generally horizontal plane) of bonded PTFE bearing material. Above the upper bearing 28 and on either side of the lower bearing 28, there are seals 30. Inside the "cup" of the sleeve 24, at one side the bore 26 terminates in an angled annular mouth 32. Adjacent the top of the "cup", there is an annular rack 34.

A cap 36 sits on top of the flange 22 of the body 12, and is secured to it by clamping means 38. Part of the cap 36 projects into the chamber 16. Thus it includes a first portion 40 which is a complementary fit in the conical wall 18 of the chamber 16 adjacent the mouth thereof. Beneath this the cap 36 forms an annular projection 42 of lesser diameter, such that there is a gap between the projection 42 and the wall 18, in which upper portions of the sleeve 24 extend. There is generally some clearance between the sleeve 24 and the projection 42 of the cap, and this accommodates a gear wheel 44 which embraces the projection 42, and meshes with the rack 34 of the sleeve 24. Beneath the rack and gear wheel there are sealing means 43 between the sleeve 24 and the cap projection 42, thus isolating the gear mechanism from the interior of the chamber 16 (and hence the pipeline).

At one side the annular projection 42 has axially projecting flanges between which is mounted a pivot shaft 48 which extends generally horizontally and transversely of the flow direction. An arm 50 is journalled on the shaft, and carries at its outer end a check plate 52. This may be mounted on the arm 50 via a bearing such that it can pivot somewhat relative to the arm 50. This may employ a spherical bearing having a low friction PTFE bearing surface. Preferably there are means for preventing the check plate 52 from rotating, which tends to cause wear.

On top of the cap 36 an actuator 54 for the sleeve 24 is shown. In fact, this may be detachable, and only applied when it is required. This actuator is operable to rotate a shaft 56 which extends into the cap 36 and turns the gear wheel 44 via gearing (not shown). The actuator may be attachable by clamping means 58 embracing flanges 60, 62 on the cap and the actuator, much as the clamping means 38 hold the cap to the body 12. A further actuator and control linkage within the cap may enable the pivoting of the arm 50 bearing the check plate 52 to be effected from the exterior of the valve assembly. It may include damping means such that when the check plate moves, whether in response to the actuator or flow conditions within the pipeline and valve, its motion is damped.

For normal use, the check valve assembly 10 is fitted in line in a pipeline, in what may be a generally conventional way. Flow of fluid (e.g. oil or gas) from left to right causes the check plate 52 and arm 50 to adopt the position shown in the figure. It is assumed that this is the normal condition. But if something happens, for example a pipeline fracture upstream, such that fluid under pressure tends to rush from right to left, the arm 50 and check plate 52 pivot clockwise, and the check plate 52 seals on the mouth 32 to close the bore 26. The damping referred to above prevents the plate 52 from hitting the mouth 32 with such violence that either is damaged. Th pivotable mounting of the plate 52 on the arm 50 ensures that the plate 52 can fit snugly against the mouth 32. Of course there will be sealing means; preferably any components that may require maintenance or replacement are on the plate 52 rather than around the mouth 32. There may be circumstances when it is desired to maintain the check plate 52 in the position shown in the figure in the absence of strong normal flow, e.g. to allow pigging of the pipeline and valve assembly in either direction. The actuator for the arm may then be operated, from the exterior. Preferably there is a valve position indicator visible externally of the assembly, so that a diver can tell the functional state of the valve assembly.

Since it may be doubted whether a simple check valve can ever give complete sealing, for added security use may be made of a larger assembly involving a check valve assembly as shown in the drawing, together with a ball valve assembly, preferably as described in our patent specification referred to above. They may then be coupled so that the displacement of the check plate 52 down to seal against the mouth 32 is detected and actuates automatic closing of the ball valve.

The illustrated check valve has two features that make for ease of maintenance: the arrangement of the sleeve 24; and the arrangement of the cap 36. Either would be advantageous on its own, but it is very much preferable to have them both as shown. Thus, when it is desired to service the valve assembly, it is first isolated from the interior of the pipeline by rotating the sleeve 24. This is effected by the actuator 54, which may be only temporarily connected for this purpose. Thus the actuator rotates the shaft 56, which rotates the sleeve 24 via the gearing, the gear wheel 44 and the rack 34. Preferably it is arranged to rotate the sleeve through a predetermined angle, e.g. 90°. The passageway 14 in the body then confronts the "blind" wall of the sleeve 24. For more reliable sealing there may actually be a pair of "blind" seals like the seals 64 provided on the sleeve about the mouths of its bore 26. Once the sleeve has been turned to seal off the pipeline, the clamping means 38 are released (possibly after release of the clamping means 58 and removal of the actuator 54). The cap 36 can then be lifted out. It carries with it the check plate 52 and its operating mechanism, and the seals. Thus all that is left on the sea bed is the body 12 and the sleeve 24, whereas virtually all of the parts which are likely to wear out or otherwise need maintenance are on the removable unit. This can be returned after maintenance; alternatively, a replacement unit can immediately be put in place, and locked by means of the clamping means 38. Plainly, no more water can get into the pipeline than the capacity of the chamber 16. This is probably entirely negligible, and can quickly and easily be flushed away once the sleeve 24 has been rotated back to its operative position, with the pipeline portions on either side in communication through the valve assembly 10. This is to be contrasted with conventional valve maintenance, in which large amounts of water tend to get into the pipeline, requiring lengthy and expensive purging. Furthermore, the maintenance can be carried out at a convenient, dry location. This is a particularly marked improvement for a check valve, since the conventional construction with the check plate pivoted via a stem passing through a hole in the body, makes maintenance virtually impossible. (It also severely restricts the material of which the stem can be made, thus increasing the likelihood of problems.)

Much of the technology described in our earlier specification No. 2,143,929 may with advantage be applied to the present invention. The wall 18 of the chamber 16 in the body may suitably have a ceramic coating as described for the socket of the body there described. The seals 64 provided on the sleeve 24 for sealing around the passage 14 may be like those analogously provided on the core of the earlier valve. Indeed, the preferred types of seal described in that earlier specification may be generally applied in the present case. We would particularly refer to the use of seals which are resistant to chemicals and to explosive decompression. Likewise, the clamping means 38 and 58 may be as previously described, suitably being multi-piece manacle clamps. It is preferred to use a manacle clamp in several (e.g. four) pieces, so that the radially outward travel required of each piece is small. Externally, the assembly may be adapted to be engaged by remotely operated vehicles.

While we have described the actuators for rotating the sleeve and pivoting the check plate as being mechanical, they could be wholly or partly hydraulic. Thus there may be a hydraulic motor for the check plate mounted in or adjacent the cap 36, e.g. coaxially with the shaft 48, with a supply conduit for hydraulic fluid having an outlet on top of the cap 36.

The sleeve 24 has low friction bearing material 28 to reduce the torque requirements from the actuator 54. It may have an inlet conduit leading from an accessible exterior point to an outlet beneath the lower seal 30. Thus if it is ever required to remove the sleeve 24, fluid under pressure may be passed through this conduit so that it enters the volume defined by the bottom parts of the chamber 16 and sleeve 24 below this seal, so as to drive out the sleeve 24 by hydraulic pressure (acting on a very large surface area). The tapering of the chamber wall 18 is sufficiently slight for the seal to allow the hydraulic action to lift the sleeve 24 for a significant distance. There may also be conduits enabling the space between the wall 18 and the sleeve to be purged with an inhibitor as an added protection.

The valve body is designed to be rigid, so as to permit insertion and removal of the cap assembly even whilst the valve assembly 10 is subject to considerable forces from medium in the pipeline. Preferably the sleeve and the cap/check plate sub-assembly are made largely of duplex stainless steel.

Although in the illustrated example the check plate 52 seals on a mouth 32 within the sleeve, it will be appreciated that a sealing mouth 32 could be on the body wall 18 instead. Indeed, the skilled reader will appreciate that much variation is possible; and that many features described herein are applicable in other contexts.

We have described an assembly in which the sleeve alone is rotatable to isolate the valve interior. An alternative is for the whole core (comprising the sleeve, the cap or bonnet, and the obturator means) to rotate. This may be particularly preferred for a ball valve such as is disclosed in our earlier specification, since its bonnet already accommodates the rotary shaft of the ball member, and it would be difficult for it also to incorporate the gear wheel 44 and associated mechanism.

While the invention has been illustrated above by reference to a preferred emcodiment, it will be understood by those skilled in the art that various changes may be made without departing from the spirit and scope of the invention and it is intended to cover all such changes and modifications by the appended claims.

It may be desired to provide means for retaining the sleeve 24 within the chamber 16. For example, there may be a bayonet-type connection. This may employ a shaped retaining member projecting from the base 20 of the chamber. This is a cylindrical projection X with four radially projecting abutments Y. The under surface of the sleeve 24 has a correspondingly shaped recess with an annular undercut, relieved in four positions to provide equispaced location points. Thus, in predetermined relative angular positions of sleeve and chamber, the sleeve can be lowered fully into the chamber, then locked by rotation. In normal use, the chamber will only be opened by removal of the cap when the sleeve is rotated to close the passage 14. In this position, the sleeve is locked against removal. Thus it will not be forced out by pressure in the pipeline.

The bayonet-type connection may also serve for precise rotational alignment of the sleeve, e.g. providing an abutment when the sleeve is turned in one sense until its bore 26 and the passage 14 are fully aligned.

To aid rotation of the sleeve, it may be lifted slightly hydraulically, by fluid passed into the volume beneath the lower seal 30, as mentioned above. The distance is limited by abutment with the cap 36, so that lateral sealing is not lost, while problems due to accumulated debris that might restrict rotation are removed. For example, the gap between the sleeve and the side wall of the chamber may be increased 2½ times.

I claim:

1. A valve assembly comprising:
   a valve body adapted for connection in a pipline and having a first through passage and a body portion providing a socket, the socket including a socket mouth which opens transversely of the first through passage, the through passage extending on either side of the socket;
   a sleeve comprising a annular sleeve body having a second through passage therein and a sleeve mouth which opens transversely of the second through passage; the sleeve being rotatably mountable within said socket through the socket mouth thereof with the socket mouth and the sleeve mouth opening in the same transverse direction, the sleeve body being dimensioned so that when the sleeve body is mounted in the socket the sleeve body is rotatable so as to bring the first and second through passages selectively into and out of mutual alignment wherein a composite through passage formed by said first and second through passages is provided; the valve body and the sleeve having mutual engagement formations which are out of engagement when the sleeve is in a first predetermined angular position relative to the body, and which are lockable in engagement by relative rotation away from said first predetermined angular positon; and
   obturator means mounted generally within the sleeve and displaceable to control a flow through said composite flow passage; the obturator means being removable through the sleeve mouth when the sleeve is positioned in a second predetermined angular positon, relative to the body, in which said first and second through passages are out of mutual alignment and in which said sleeve is not disengateable from the valve body.

2. A valve assembly according to claim 1 wherein the obturator means comprises a check plate of a check valve subassembly which further comprises a cap member, to which the check plate is pivotally connected, for closing the sleeve mouth.

3. A valve assembly according to claim 2 wherein the socket mouth is adapted to be closed by the cap member.

4. A valve assembly according to claim 2 having drive means for rotating the sleeve at least partly housed within the cap member.

5. A valve assembly according to claim 4 wherein the drive means comprise an actuator connectable to the cap member externally; and transmission means extending through the cap member to transmit drive from the actuator to the sleeve.

6. A valve assembly according to claim 2 wherein a valve seat is provided adjacent the composite through passage, and sealing means are provided on the check plate; the arrangement being such that the check plate is pivotable to close off the composite through passage by engagement of the sealing means with the valve seat; the sealing means being removable as a unit with the rest of the obturator means.

7. A valve assembly according to claim 2 further including actuation means for actuating pivoting of the check 8. A valve assembly according to claim 1 wherein the sleeve carries seal means and bearing means for sealing and bearing respectively on the body portion.

* * * * *